Oct. 20, 1959  G. F. QUAYLE  2,909,299
LOAD SUPPORT SHIFTING MECHANISM FOR INDUSTRIAL TRUCK
Filed May 23, 1956  5 Sheets-Sheet 2
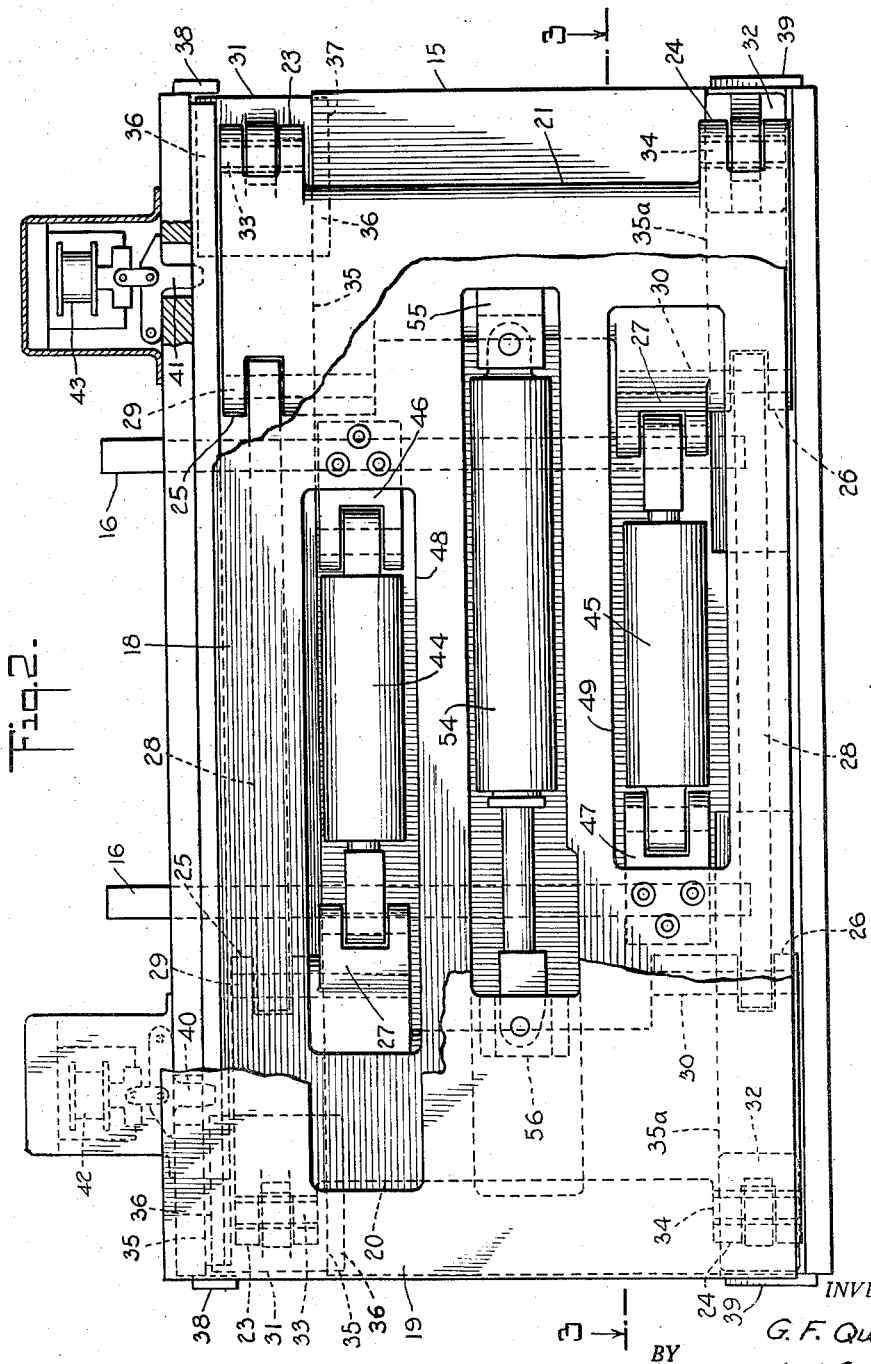
INVENTOR.
G. F. QUAYLE
BY
A. H. Golden
ATTORNEY

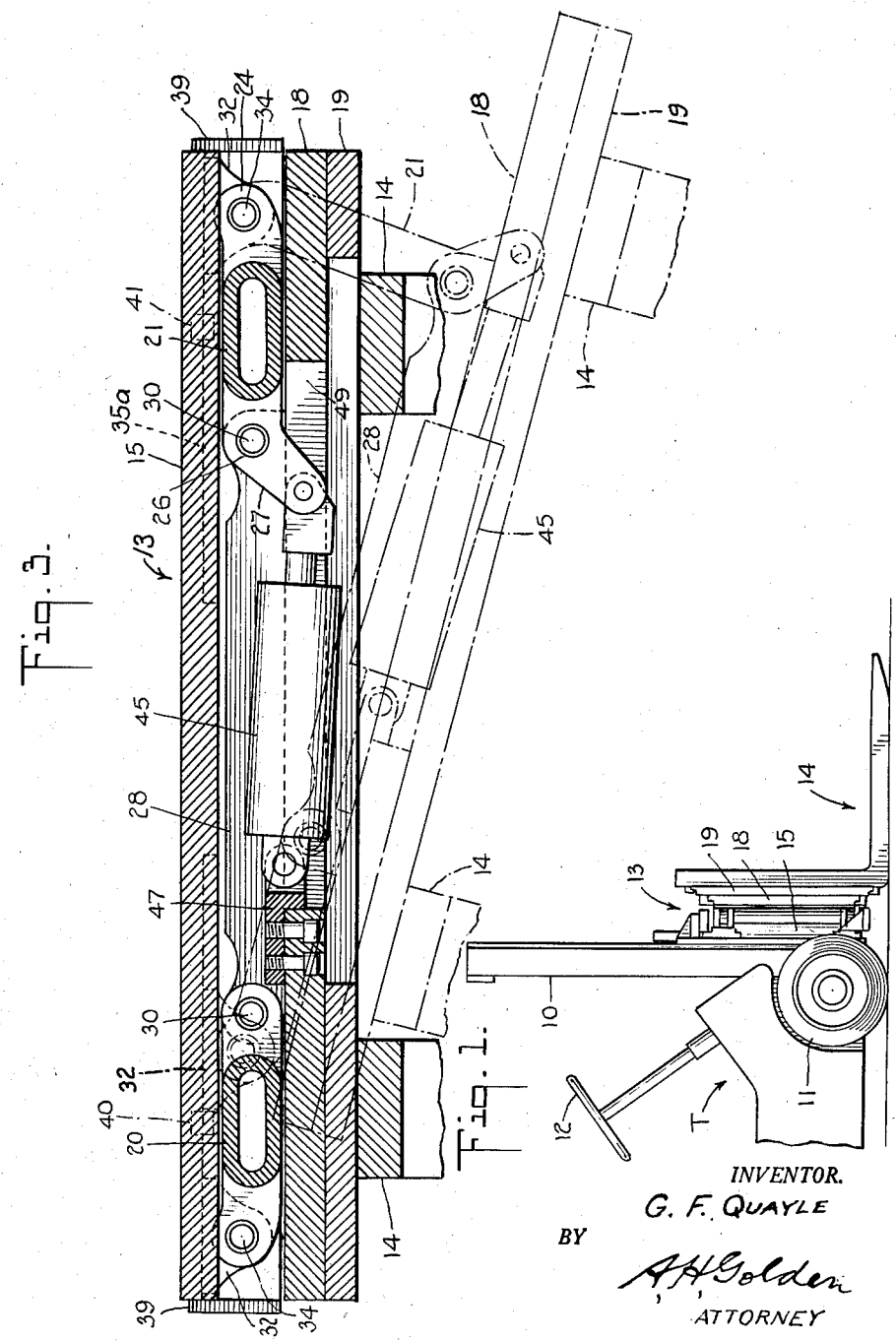

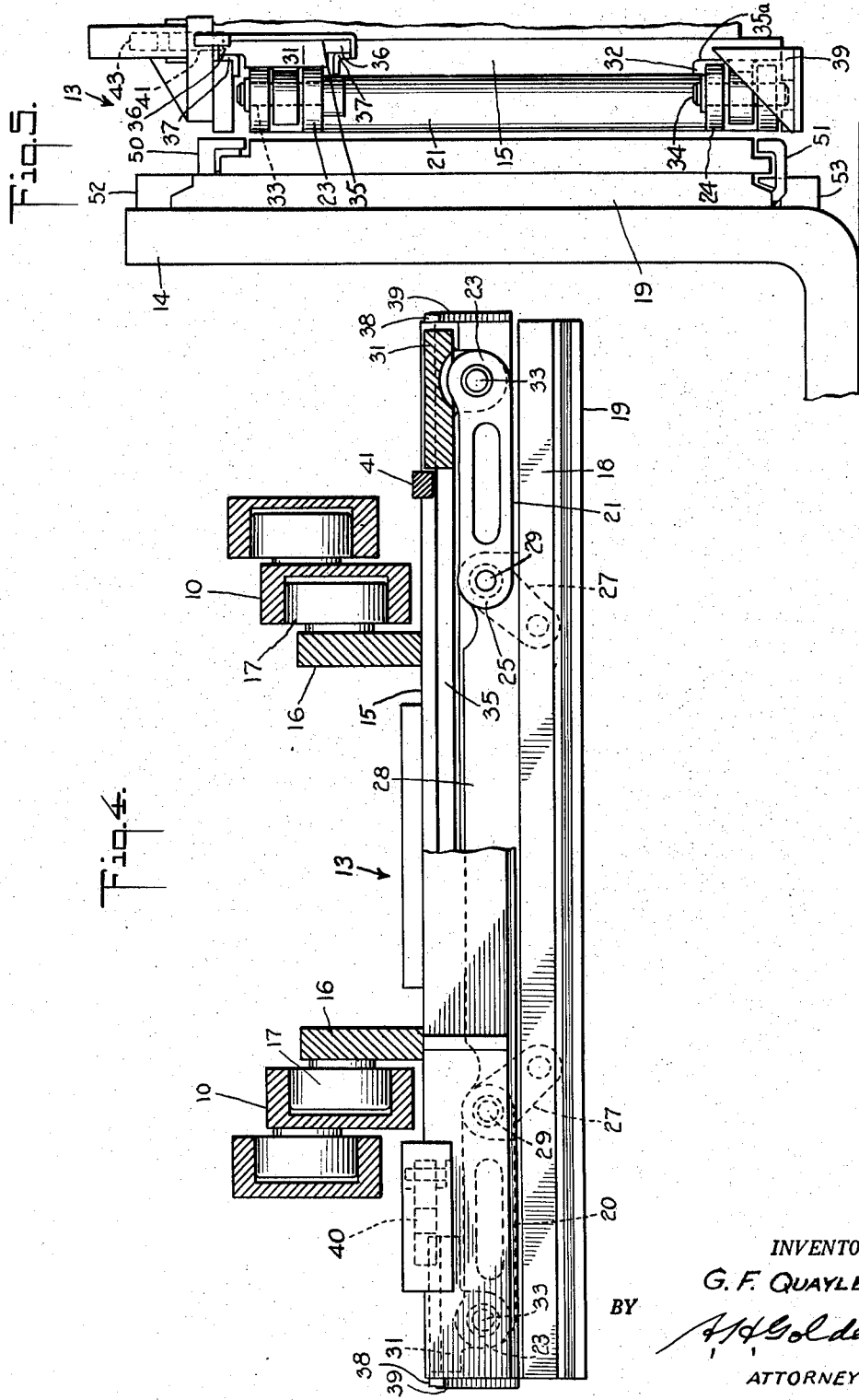

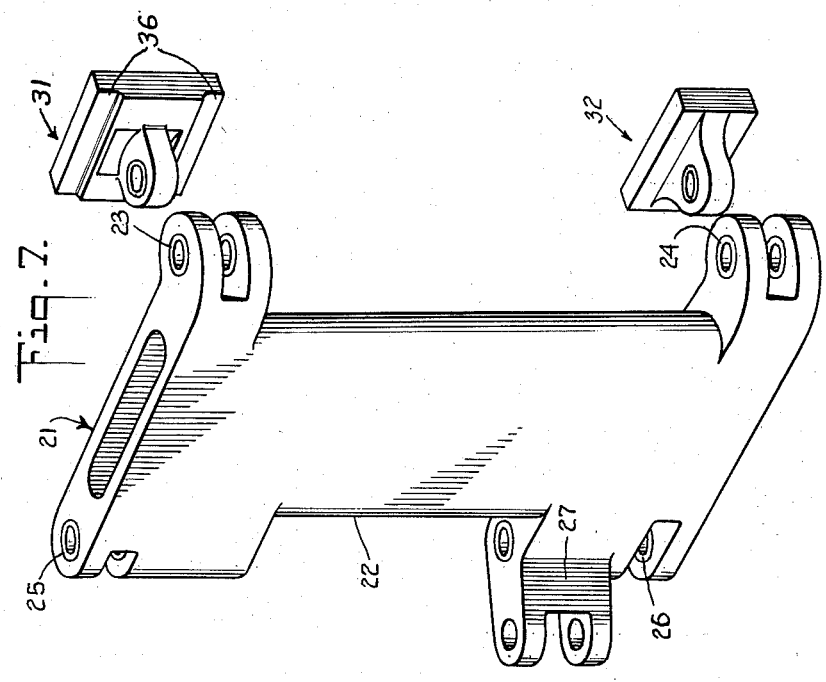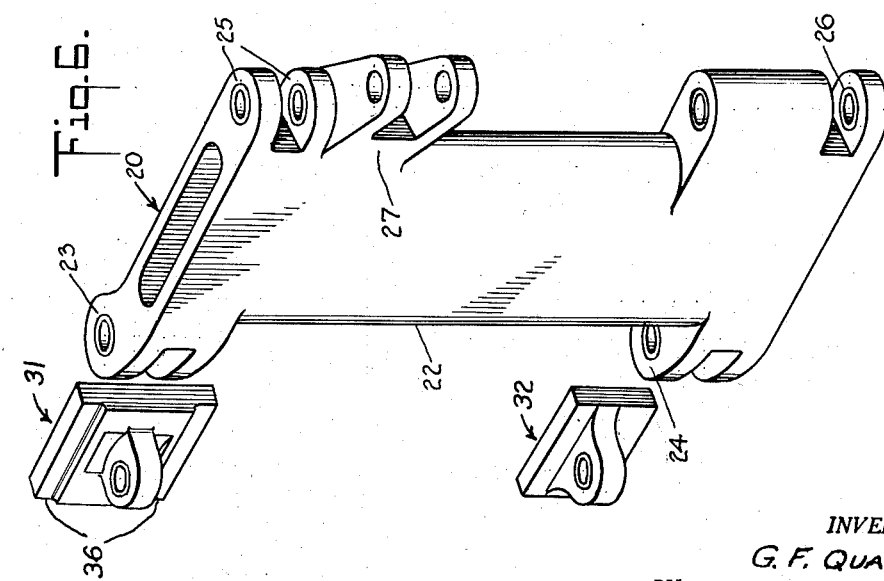

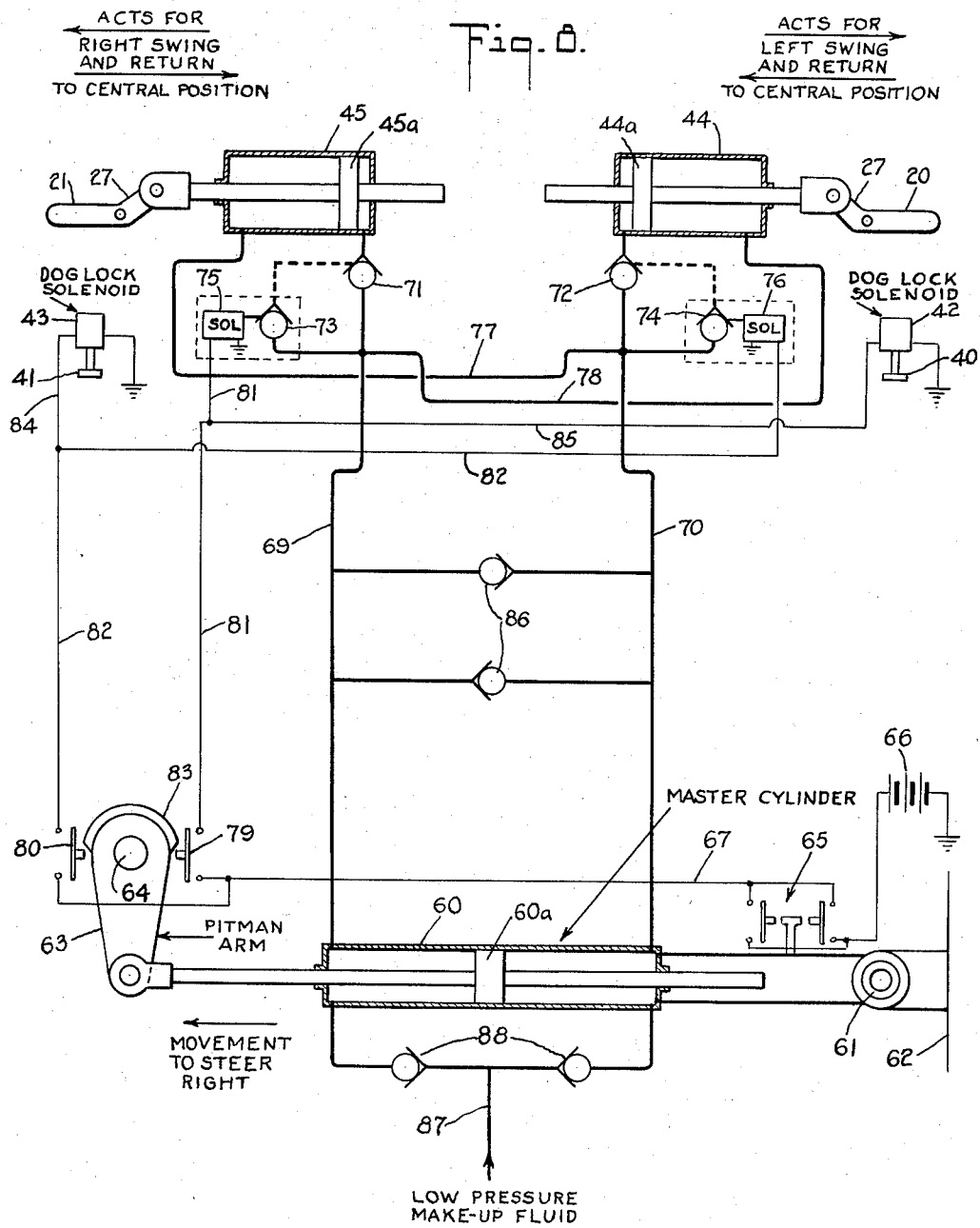

United States Patent Office 2,909,299
Patented Oct. 20, 1959

2,909,299

LOAD SUPPORT SHIFTING MECHANISM FOR INDUSTRIAL TRUCK

George F. Quayle, Philadelphia, Pa., assignor to The Yale & Towne Manufacturing Company, Stamford, Conn., a corporation of Connecticut Application May 23, 1956, Serial No. 586,765

14 Claims. (Cl. 214—652)

This invention relates to means for moving the load platform of an industrial truck relatively to the remainder of the truck in order to facilitate movement of the truck through narrow aisles.

It has earlier been suggested that the load platform of a truck, such as load carrying forks, be equipped with a shifting device whereby the forks are pivoted relatively to the truck in order to facilitate manipulation of the truck in aisles. Thus, where a truck is to move around a corner to its left, the platform or forks can be swung to the left as the truck moves around the corner. Similarly, the forks can be swung to the right if the truck is to be moved about a corner to its right. However, a load shifting device of this type is not entirely satisfactory since the load may be manipulated so as to unbalance the truck and even to tip the truck.

It has further been suggested that means be utilized for pivoting the load carrying platform or forks of a truck and also to shift the forks or load platform laterally relatively to the pivot. However, it has been found that this also tends to move the load to a position where it disturbs the equilibrium or stability of the truck so that the handling of the truck may become very dangerous. Specifically, in a conventional structure in which the load is pivoted and shifted, the pivot point about which the pivotal movement of the load platform takes place is rearward of the platform, so that the load center is moved through a considerable angle, which is naturally undesirable.

The contribution that I shall set forth in this application relates to a load platform or fork movement that is inherently stable because, while a part of the load is moved in one direction relatively to the truck, another part of the load is moved in the opposed direction. Thus, if the load is pivoted to the left, it is understood that the extreme end of the load away from the truck will naturally be moved the greatest distance to the left. That portion of the load closest to the truck will, however, be moved to the right, thereby acting to stabilize the load and the truck while contributing the pivoting movement that is required to facilitate the manipulation of the truck in the narrow aisle.

Thus, as a feature of my invention, I contribute a load platform that is adapted for pivotal swinging movement relatively to a truck, with the feature that as the platform is swung in one direction, its base, or its portion nearest the truck, is actually moved in the opposed direction.

More specifically, my invention utilizes a load platform or forks that are mounted for pivotal and swinging motion relatively to the frame of the truck, this motion being such that it is accompanied by a movement of a part of the load in the opposed direction. I accomplish that movement while utilizing pivots that are entirely to the rear of the load platform, yet with the load platform supported in close relation to the front of the truck. Even more specifically, the load platform of my truck is supported at each side thereof relatively to the main frame through novel shifting means utilizing links. When the platform moves about one link in a pivotal direction on the shifting means, the link at the other side is shifted relatively to the truck main frame, so that the load platform therefore swings on one link and pivot while the other pivot slides to allow the swinging movement of the first link.

As a still further feature of the invention, control means are utilized so as to lock the pivot of one link against motion while releasing the pivot of the opposed link for motion. Therefore, when the actuating means, preferably in the form of a ram, are utilized to swing the load platform or forks on one link, the pivot of the other link is released for movement so that it may slide, while the link that is free to swing is permitted to swing because its pivot is locked against movement.

As a still further feature of my invention, I effect the movement of the load platform in one direction or the other in response to the movement of the steering mechanism of the truck. Thus, when the truck is steered in one direction, the platform moves to facilitate the manipulation of the truck in that direction. On the other hand, when the truck is steered in the reverse direction, the load platform moves in that direction. In other words, with the steering wheel rotating in one direction, the pivot of one of the links is locked against movement, so that the hydraulic ram that is energized to effect swinging of the load will actually swing the load platform relatively to the pivot that is fixed, while the other link will move with its pivot relatively to the truck, permitting the pivoting and shifting movement of the load, as has already been set forth.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 shows my novel shifting means on the front end of an industrial truck.

Fig. 2 is a front view showing my invention with parts broken away.

Fig. 3 is a cross-section on the line 3—3 in Fig. 2.

Fig. 4 is a top view with parts broken away.

Fig. 5 is a side view of Fig. 4.

Figs. 6 and 7 show the novel supporting links and sliding bearings that I utilize in my invention.

Fig. 8 is a diagrammatic view showing the power system of my shifting means.

In order that my invention may be readily understood, I show in Fig. 1 the front end of an industrial truck T of the class that has uprights 10 for supporting a vertically moving load carrier relatively to the truck. The truck has front drive wheels 11 and is equipped with steering wheels that are steered by the truck driver through a wheel 12, as will be understood by those skilled in the art. I indicate my novel shifting means generally by the number 13 in Fig. 1, those means mounting a load carrier 14 on the uprights 10 for the usual vertical movement, but contributing also the novel shifting movements that I shall describe in detail. I have chosen to illustrate the load carrier 14 as a pair of forks, but the particular type of carrier is not important. It is necessary to know merely that I support a forwardly extending load carrier on the truck T through my novel shift means 13, and that the truck together with the load carrier or forks 14 may be steered through the operation of steering wheel 12.

Referring now to Figs. 1 to 5 of the drawings, I utilize in my novel shift means 13 a base member 15 that is mounted on the truck uprights 10, this member being preferably a vertical plate. Merely for the purpose of disclosing the mounting of this base plate or member 15, I show it equipped in Fig. 4 with a pair of brackets 16 having rollers 17 that run in channels in the truck uprights 10. I further utilize in my shift means 13 a swinging plate 18 that supports the load carrier or forks 14. I prefer to mount the forks 14 through a front plate 19 that slides on the swinging plate 18, as I shall describe, but this sliding is not essential to my invention, and I shall proceed first to describe the exceedingly novel construction whereby the swinging plate 18 moves on the base plate 15.

As an important part of that construction, my shifting means 13 has a pair of links 20, 21 that are shown assembled in Figs. 2 to 5, but that can be seen in detail in Figs. 6 and 7. Each of the links 20, 21 has a vertically extending body portion 22 that is relatively narrow, but extremely rigid. On what I shall term the rear end of each link 20, 21, the body portion 22 has upper and lower bearing means 23, 24 that are aligned in a vertical axis. Also, each link has on its opposed front end upper and lower bearing means 25, 26 arranged in a vertical axis. The front end of each link has further an arm 27 that extends in an angular direction and that is formed with openings for a pivot through which the link will be actuated, as will appear.

Together with the links 20, 21, I utilize two upper sliding bearings 31 and two lower sliding bearings 32, Figs. 2, 6, and 7, for what I term the rear ends of the links, those being the ends shown at the extreme right and left sides of Fig. 2. Links 20, 21 are in pivoted relation to sliding bearings 31, 32 with upper and lower pivot pins 33, 34 between those bearings and the corresponding bearing means 23, 24 on each link. As well shown in Figs. 2 and 5, the upper sliding bearings 31 are mounted in a guideway 35 for movement in a transverse direction on the upper part of base plate 15, while lower sliding bearings 32 have corresponding movement in a guideway 35a near the lower edge of plate 15. To hold the upper sliding bearings 31 relatively to the guideway 35, I show the guideway formed with surfaces 35, Fig. 5, that overlie upper and lower portions 36 on the bearings 31, but the particular details of the guideway 35 or 35a are not important to an understanding of my invention. It is necessary at this point to know merely that the upper and lower sliding bearings 31, 32 support each link 20, 21 to pivot relatively to base plate 15, while enabling the link also to slide in a transverse direction on that plate.

Referring again to Fig. 2, I pivot the front end of each link 20, 21 to swinging plate 18 through pivot pins 29, 30 on the upper and lower bearing means 25, 26 on the link. I show swinging plate 18 equipped with upper and lower brackets 28 for the pins 29, 30, but it is conceivable that the plate may have other particular bearings for the pins.

It will be appreciated that, through the construction I have thus far described, the swinging plate 18 is pivoted to the base plate 15 through the link 20 at one side and through the link 21 at the other side. Since the links 20, 21 are extremely rigid, they will very effectively support the swinging plate 18 and forks 14 relatively to the base plate 15, while enabling me to effect the extremely novel swinging movements of plate 18 that I shall describe.

As best shown in Fig. 2, the sliding of bearings 31, 32 outwardly toward opposed sides of base plate 15 is limited by stops 38, 39 on upper and lower portions of plate 15. Normally, the sliding bearings 31, 32 are juxtaposed to those stops 38, 39, as in Fig. 2, the bearings then supporting the links 20, 21 in a transverse position. That transverse position of links 20, 21 is the solid line position shown in Fig. 3, with the links 20, 21 supporting the swinging plate 18 in an initial central position parallel to base plate 15. At this point it may be well to note that the links 20, 21, by their normal position transverse to the truck, enable the swinging plate 18 and forks 14 thereon to be arranged in rather close relation to the base plate 15. This in itself is one of the important features of my invention.

I lock the sliding bearings 31, 32 relatively to their stops 38, 39 through a pair of dogs 40, 41, Fig. 2, that are pivoted on the base plate 15 in position to extend into the upper guideway 35. The dogs 40, 41 do, however, have corresponding solenoids 42, 43 that can act independently of one another to move each dog to release position. I utilize this control over the sliding bearings 31, 32 in a particular manner, as will appear.

I actuate the links 20, 21 through a pair of hydraulic rams 44, 45, best seen in Fig. 2. The ram 44 acts between a bracket 46 on the swinging plate 18 and the arm 27 on the link 20 for rotating that link, and the ram 45 acts similarly between a bracket 47 on plate 18 and arm 27 on link 21. Since swinging plate 18 is quite close to base plate 15, I form plate 18 with openings 48, 49 whereby that plate has clearance relatively to the rams 44, 45. It will be appreciated that I can utilize either ram 44, 45 for rotating its corresponding link 20 or 21.

The particular swinging movements that I effect through rams 44, 45 will be best understood if we refer to Fig. 3, in which I show the ram 45 swinging the link 21 to a dot and dash position. To enable the ram 45 to swing link 21 to that position, I utilize the dog 41 to lock the sliding bearing 31 for that link. Thus, link 21 pivots away from its transverse position relatively to base plate 15, but does not slide relatively to base plate 15. In addition, I move the opposed dog 40 to release position, thus enabling link 20 to slide on its bearings 31, 32, all as shown in dot and dash lines in Fig. 3. I thereby effect a particular movement of the swinging plate 18, with one part of the load forks 14 moving to one side of the truck axis while that portion of the forks which is nearest to the truck actually moves to the opposed side of the truck axis. Through those movements, the load forks 14 will not impair the stability of the truck T while swinging to facilitate the manipulation of the truck in narrow aisles. Naturally, it is possible to swing the load forks 14 in either direction away from their initial central position, simply through the rotation of the appropriate link 20 or 21 by its corresponding ram 44 or 45, with the dog 40 or 41 locking that link against sliding while releasing the opposed link. Whether the forks swing in one direction or the other, the truck will be inherently stable because of the movements that are contributed by my novel shift means.

I have already referred to the front plate 19 that can be utilized to support the load forks 14 for sliding on the swinging plate 18. Front plate 19 is not an important part of my invention, but when utilized will enable forks 14 to have a further shifting movement. Front plate 19 is mounted to slide in a transverse direction on plate 18 through upper and lower brackets 50, 51, best seen in Fig. 5, while forks 14 are mounted on front plate 19 through the conventional clips 52, 53. I then utilize a hydraulic ram 54, Fig. 2, that acts between a bracket 55 on swinging plate 18 and a bracket 56 on front plate 19. Through the actuation of ram 54, I can effect a shifting of the forks 14 in addition to the shifting that is effected through the links 20, 21.

I shall now describe that part of my invention whereby I actuate and control the movements of my novel shift means 13, with the load forks 14 swinging in particular relation to the steering of the truck. Referring particularly to Fig. 8 of the drawings, I show diagrammatically the hydraulic rams 44 and 45, and the locking dogs 40 and 41. It will be understood, from the description that I have thus far made, that ram 44 effects those swinging movements of the load forks 14 that are to the left of their initial centered position. To do this, ram 44 rotates link 20 while dog 40 locks that link against sliding, with dog 41 leaving the opposed link 21 free for sliding. Similarly, the ram 45 can rotate the link 21 to effect those swinging movements of the forks that are to the right of their centered position, that link 21 then being locked by its dog 41 while link 20 is free from its dog 40.

For applying fluid pressure to the rams 44, 45, I utilize a master cylinder 60 shown in Fig. 8. I anchor the master cylinder 60 through yielding means, utilizing preferably for that purpose a pivot 61 of yielding material such as rubber that is mounted on the frame 62 of the truck T. I arrange the piston 60a in the master cylinder to move with the steering movements of the truck wheels 11, and for this purpose I show piston 60a pivoted to a pitman arm 63 that rotates integrally with a shaft 64 on the steering apparatus of the truck. The arrangement is such that pitman arm 63 will hold piston 60a in a medial position in the master cylinder while the truck wheels steer the truck straight ahead. Associated with the master cylinder 60 is a contactor 65 that is normally in open circuit position, but that will close a circuit in response to a small movement of cylinder 60. When the hydraulic pressures acting on the opposed ends of master cylinder 60 are unbalanced, that cylinder will move somewhat in one direction or the other through yielding of the pivot 61, thus moving contactor 65 and closing a circuit between a battery 66 and a wire 67. The contactor 65 thereby enables me to actuate the electrical parts of my control when the truck is actually being steered, but will act, regardless of the steered position of the truck wheels, to prevent a drain of electric current from the battery 66 when the pressures in cylinder 60 are substantially in equilibrium.

One end of the master cylinder 60 is connected to ram 45 through a line 69, while the other end of master cylinder 60 is connected to ram 44 through line 70. Master piston 60a can thus direct fluid pressure through lines 69, 70 for moving outwardly the piston 45a or 44a in the corresponding ram 45 or 44. However, I control the fluid pressure in the lines 69, 70 independently through check valves 71, 72 in those lines. Check valves 71, 72 allow fluid to flow away from the inner ends of rams 44, 45 through lines 69, 70, but normally are in position to prevent the application of fluid pressure to those ends of the rams. To permit such application of pressure, I control check valves 71, 72 by corresponding pilot check valves 73, 74. These pilot check valves 73, 74 are of a standard type and control the valves 71, 72 in a manner usual in the hydraulic art. Solenoids 75, 76 are used to move one or the other of the pilot check valves 73, 74 to open position and are in turn controlled as I shall set forth presently. Cross-connecting lines 77, 78 extend between the hydraulic lines 69, 70 and the rams 44, 45, these lines 77, 78 being open lines and placing the outer ends of rams 44, 45 at all times in communication with the master cylinder 60. It will be well to observe here briefly that, in the arrangement I have thus far described, the master piston 60a can act through lines 69, 70 and 77, 78 to direct fluid pressure toward either end of each ram 44, 45. The pressure that is directed through one of the cross-connecting lines 77, 78 will be applied freely to the outer end of a ram, but the pressure directed toward the inner ram ends will be controlled through the check valves 71, 72.

For controlling check valves 71, 72, I utilize switches 79, 80 for closing circuits between the wire 67 and either of the wires 81, 82 that lead to solenoids 75, 76. Solenoids 75, 76 operate pilot check valves 73, 74 that in turn operate valves 71, 72. Through wires 84 and 85 the locking dog solenoids 42, 43 are in parallel with solenoids 75, 76. A cam 83 moves with the pitman arm 63 for actuating switches 79, 80. It is important to observe that switches 79, 80 are normally in open circuit position, that being their position when the truck is steered straight ahead, and that cam 83 is formed to close one or the other of switches 79, 80 depending upon the direction the truck is steered.

Thus, if we assume that the truck is steered to the right, the pitman arm 63 will rotate clockwise in the direction of the arrows in Fig. 8 and cam 83 will close switch 79. Of course, pitman arm 63 by its movement will develop fluid pressure in the left-hand end of master cylinder 60, as viewed in Fig. 8, thereby moving that cylinder somewhat through yielding of pivot 61 and moving contactor 65 to closed position. With a circuit closed between battery 66 and solenoid 75, that solenoid will effect opening of the check valve 71 through pilot valve 73, as is well known in the art. Solenoid 42 will also be energized to hold locking dog 40 in release position to permit sliding of link 20.

We now have the opposed ends of the hydraulic ram 45 in open communication with opposed ends of master cylinder 60, that is, through line 69 at one end, and through lines 77, 70 at the other end. Therefore, so long as the truck is steered between positions to the right of a straight ahead position, the piston 45a in ram 45 will follow the movements of the master piston 60a. It will be remembered that the link 21 swings load forks 14 to the right relatively to the truck. This link 21 is still locked against sliding by its dog 41, but link 20 can slide because its dog 40 is now in release position. Since ram 45 rotates the link 21, with sliding of link 20 on its bearings 31, 32, Fig. 2, it will be understood that the forks will follow steering movements of the truck to the right, and then back again until the forks reach their initial centered position.

During these movements to the right of centered position, the opposed ram 44 does not rotate the link 20 out of its normal position since check valve 72 remains closed. However, ram 44 does act to hold link 20 in normal position. This will be understood when considering the fact that the cross-connecting line 78 maintains the outer end of ram 44 always in communication with master cylinder 60, as I have already described. Thus, the pressure applied through hydraulic line 69 for moving ram 45 will also act through line 78 against the outer end of ram piston 44a. When the pressure acts in that way against piston 44a, the check valve 72 naturally will permit low pressure fluid to move from the opposed end of piston 44a toward the low pressure end of master cylinder 60. Therefore, when ram 45 rotates link 21, the opposed ram 44 will rotate link 20 to normal position if for any reason it is not already in that position.

I believe it will not be necessary to describe in detail the hydraulic operation that will swing the forks to the left of their centered position, since that operation is the same as I have already described, but with the parts acting in reverse fashion. It should also be emphasized that while I prefer to swing the load automatically in response to the steering of the truck, I may find it desirable in many installations to use simple manual means for actuating the solenoids and rams, and my invention should therefore not be considered as limited to the automatic construction described.

I do incidentally show in Fig. 8 a pair of pressure relief valves 86 that act in opposed directions between the hydraulic lines 69, 70. Those relief valves 86 are set at a pressure higher than that normally utilized in the system, and act merely to permit fluid to transfer from one side of the system to the other if for any reason an excessive quantity of fluid should become trapped on one side. I show also a low-pressure line 87 for supplying make-up fluid to opposed sides of the system, with check valves 88 that prevent the escape of high pressure fluid through that line.

I believe that those skilled in the art will now understand the operation and advantages of my extremely novel load carrier shifting means. Through my invention, I can make an industrial truck inherently stable, despite the fact that the truck has a load carrier that swings to facilitate the movements of the truck in narrow aisles. I accomplish this through extremely novel means that contribute compound shifting movements to the carrier. While contributing those movements, moreover, my novel construction will support the carrier very effectively, with the carrier arranged in very close relation to the front of the truck. In addition, I am able to effect automatically the compound swinging of the carrier as the truck is steered, thus facilitating even further the movements of the truck. I believe, therefore, that the very considerable value of my invention will be fully appreciated.

I now claim:

1. In a truck of the class described, a base member carried by said truck, a load carrier arranged forwardly relatively to said base member, link means pivoted to said load carrier at one side of the rear end thereof, further link means pivoted to said load carrier at the opposed side of the rear end thereof, a pivot between each link means and said base member, means mounting each of said pivots to slide on the base member, means for swinging said load carrier on each of said link means in one direction or the other, and means for holding one of said pivots against sliding during said swinging movement while said other pivot slides, whereby to effect compound swinging movement of the load carrier bodily relatively to said base member.

2. In a truck of the class described, a base member carried by said truck, a load carrier, a pair of link means pivoted to said load carrier at spaced points on the rear end thereof, a pivot for each link means slidably mounted on said base member, said link means lying substantially transverse of said truck when said carrier is in a central initial position relatively to said base member, means for swinging said load carrier on said link means in one direction or the other, and means for holding one of said pivots against sliding during said swinging movement while said other pivot slides, whereby to effect compound swinging movement of the load carrier bodily relatively to said base member.

3. In a truck of the class described, a base member carried by said truck, a load carrier arranged forwardly relatively to said base member, a link pivoted to said load carrier at one side of the rear end thereof, a further link pivoted to said load carrier at the opposed side of the rear end thereof, a pivot for each of said links slidably mounted on said base member, means for swinging said load carrier on each of said links in one direction or the other, steering apparatus for said truck, and means actuated incidental to the movement of said steering apparatus in opposed directions for effecting the holding of one of said pivots against sliding during said swinging movement while said other pivot slides, whereby to effect compound swinging movement of the load carrier bodily relatively to said base member.

4. In a truck of the class described, a base member carried by said truck, a load carrier, means mounting the rear end of said load carrier on said base member with the carrier in a position extending forwardly from said base member, said means comprising a link secured at one side of said load carrier, a further link secured at the opposed side of said load carrier, pivot means mounting each of said links on said base member for movement relatively thereto, hydraulic ram means for swinging said load carrier on said links in one or the other direction relatively to said base member, and control means for controlling the movement of said load carrier relatively to said base member on said links including means for selectively pivoting one link and for preventing pivoting of the other link to selectively swing one end or the other of said load carrier away from said base member.

5. In a truck of the class described, a base member carried by said truck, a load carrier, means mounting the load carrier on said base member in a position extending forwardly of said truck base member for swinging movement relatively to the longitudinal truck axis, steering apparatus for said truck, power means for swinging said load carrier on said mounting means in opposed directions relatively to the truck axis, and control means for said power means actuated by said steering apparatus for controlling said swinging movement of said load carrier.

6. In a truck of the class described, a base member carried by said truck, a load carrier, means mounting the rear end of said load carrier on said base member with the carrier in a position extending forwardly from said base member, said means comprising a pair of links pivoted to said load carrier at spaced points, pivot means mounting said links on said base member for movement relatively thereto, said links lying substantially transverse of said truck when said carrier is in a central initial position relatively to said base member, hydraulic ram means for swinging said load carrier on said links in one or the other direction relatively to said base member, and control means coacting with the load carrier mounting means for controlling the movements of said load carrier.

7. In a truck of the class described, a base member carried by said truck, a load carrier, means mounting the load carrier in a position extending forwardly of said truck base member for swinging movement relatively thereto and comprising a link pivoted to said load carrier at each side of the rear end thereof, each of said links extending from its pivot on said carrier toward one side of the base, a pivot for each link slidably mounted on said base, a hydraulic ram pivoted to each of said links for rotating the link, and means for holding one of said slidable pivots against sliding as its link rotates thereon while said other pivot slides with its link whereby to effect swinging of said load carrier relatively to said base member.

8. In a truck of the class described, a base member carried by said truck, a load carrier, means mounting the load carrier in a position extending forwardly of said truck base member for swinging movement relatively thereto, said means comprising a pair of links pivoted to said load carrier at spaced points on the rear end thereof, each of said links extending from its pivot on said carrier toward one side of the base and lying substantially transverse of said truck when said carrier is in a central initial position relatively to said base member, a pivot for each link slidably mounted on said base, a hydraulic ram pivoted to each of said links for rotating the link, and means for holding one of said slidable pivots against sliding as its link rotates thereon while said other pivot slides whereby to effect compound swinging movement of said load carrier relatively to said base member.

9. In a truck of the class described, a base member carried by said truck, a load carrier, means mounting the load carrier in a position extending forwardly of said truck base member for swinging movement relatively thereto, comprising a link pivoted to said load carrier at each side of the rear end thereof, each of said links extending from its pivot on said carrier toward one side of the base, a pivot for each of said links slidably mounted on said base, hydraulic rams for swinging the load carrier on said links, a steering apparatus, means whereby said steering apparatus effects operation of said hydraulic rams, and means controlled by said steering apparatus for holding the slidable pivot of one link against sliding as the link rotates thereon while the slidable pivot of the other link slides on its mounting, whereby to effect by said hydraulic rams the compound swinging of said load carrier relatively to said base member.

10. In a truck of the class described, a base member carried by said truck, a load carrier, a pair of link means acting at spaced points on the rear end of the load carrier to support the carrier, a pivot for each link means mounted to slide on said base member, said link means lying substantially transverse of said truck when said carrier is in a central initial position relatively to said base member, opposed hydraulic rams mounted relatively to the load carrier, means whereby one of said rams rotates one link means relatively to its transverse position on its pivot while the opposed ram holds the other link means against rotation, and means for holding against sliding the pivot for the link means that rotates while enabling the pivot for the other link means to slide, whereby to effect compound swinging movement of the load carrier bodily relatively to said base member.

11. In a truck of the class described, a base member carried by said truck, a load carrier, a link pivoted to said load carrier at each side of the rear end of the carrier, a second pivot for each link mounted to slide on said base member, opposed hydraulic rams for effecting rotation one or the other of said links on their pivots, steering apparatus for said truck, means through which said steering apparatus when steered actuates one or the other of said rams to rotate a link at one side or the other of the carrier, and means controlled by said steering apparatus for holding against sliding the sliding pivot for the rotating link while enabling the sliding pivot of the other link to slide.

12. In a truck of the class described, a base member carried by said truck, a load carrier, means mounting the load carrier in a position extending forwardly of said truck base member for swinging movement relatively thereto comprising a link pivoted to said load carrier at each side of the rear end thereof, each of said links extending from its pivot on said carrier toward one side of the base, a pivot for each of said links slidably mounted on said base, said links lying substantially transverse of said truck when the load carrier is in a central initial position relatively to the base member, opposed hydraulic rams mounted on the load carrier, means pivoting each ram to a link for rotating that link, a steering apparatus, means whereby said steering apparatus when steered effects operation of one or the other of said hydraulic rams to rotate its link relatively to transverse position, and means controlled by said steering apparatus for holding the slidable pivot of the rotating link against sliding while enabling the slidable pivot of the other link to slide on its mounting.

13. In a truck of the class described, a base member carried by said truck, a load carrier, a link extending between the load carrier and base member at each side thereof to support the carrier relatively to the base member, a pivot for each of said links slidably mounted on said base member, a hydraulic ram for rotating each link on its pivot, a steering apparatus, hydraulic means actuated by the steering apparatus as the truck is steered to operate one of said rams to rotate its link when the truck is steered at one side of a straight ahead position and the other of said rams when the truck is steered at the other side of said position, and means controlled by the steering apparatus to hold against sliding the slidable pivot of the link that rotates while enabling the slidable pivot of the other link to slide.

14. In a truck of the class described, a base member carried by said truck, a load carrier, a link extending between the load carrier and base member at each side thereof to support the carrier relatively to the base member, a pivot for each of said links slidably mounted on said base member, said links lying substantially transverse of the truck when the load carrier is in a central initial position relatively to the base member, opposed hydraulic rams for swinging the load carrier on said links, a steering apparatus, a master hydraulic cylinder actuated by the steering apparatus as the truck is steered, means through which said master cylinder applies fluid pressure to one of said rams to rotate the load carrier on one link out of transverse position when the truck is steered to one side of a straight ahead position, means controlled by the steering apparatus to hold against sliding the pivot of the link that rotates while enabling the slidable pivot of the other link to slide on its mounting, whereby said steering apparatus effects through said master cylinder and pivot holding means a compound swinging of the load carrier.

References Cited in the file of this patent
UNITED STATES PATENTS

| | | |
|---|---|---|
| 2,357,397 | Fuller | Sept. 5, 1944 |
| 2,682,350 | Garrett | June 29, 1954 |
| 2,706,062 | Turner et al. | Apr. 12, 1955 |
| 2,753,066 | Arnot | July 3, 1956 |

FOREIGN PATENTS

| | | |
|---|---|---|
| 1,114,140 | France | Dec. 12, 1955 |
| 1,137,927 | France | June 5, 1957 |